(12) United States Patent
Renders

(10) Patent No.: US 6,826,925 B2
(45) Date of Patent: Dec. 7, 2004

(54) APPARATUS FOR COLLECTING AND PURIFYING REFRIGERANT IN AIR CONDITIONING SYSTEMS

(75) Inventor: Marie Joseph Renders, Beersel (BE)

(73) Assignee: North European Patents & Investments H.S.A. Societe Anonyme, Luxembourg (LU)

( * ) Notice: Subject to any disclaimer, the term of this patent is extended or adjusted under 35 U.S.C. 154(b) by 0 days.

(21) Appl. No.: 10/448,623

(22) Filed: May 30, 2003

(65) Prior Publication Data

US 2004/0000163 A1 Jan. 1, 2004

(30) Foreign Application Priority Data

May 31, 2002 (EP) ............................................. 02012079

(51) Int. Cl.[7] .......................... F25B 45/00; F25B 43/04
(52) U.S. Cl. ................................. 62/475; 62/77; 62/292
(58) Field of Search ............................. 62/475, 474, 77, 62/292, 503, 195, 85

(56) References Cited

U.S. PATENT DOCUMENTS

| | | | |
|---|---|---|---|
| 4,939,903 A | | 7/1990 | Goddard ........................ 62/77 |
| 4,942,741 A | * | 7/1990 | Hancock et al. .............. 62/292 |
| 5,101,641 A | | 4/1992 | Van Steenburgh, Jr. ........ 62/292 |
| 5,327,741 A | | 7/1994 | Mason et al. .................. 62/149 |
| 5,379,607 A | * | 1/1995 | Sergius ......................... 62/126 |
| 6,263,695 B1 | | 7/2001 | Renders ........................ 62/475 |
| 6,408,637 B1 | * | 6/2002 | Hanson et al. ................. 62/292 |

* cited by examiner

*Primary Examiner*—Chen-Wen Jiang
(74) *Attorney, Agent, or Firm*—Simpson & Simpson, PLLC

(57) ABSTRACT

An apparatus (100) for collecting and purifying a refrigerant fluid in air conditioning systems, comprising
a first tubular body (110), used as evaporator and separator of impurities of refrigerant (130) coming from a refrigerant circuit (50), through ducts (51) and (52), and a second tubular body (104) used for separating the fluid (130) from the oil (131) entrained during a compression step. First tubular body (110) and second tubular body (104) are arranged between a top distribution flange (101) and a bottom distribution flange (106). In said flanges a plurality of channels are made, which form portions of the circuit for refrigerant (130), as well as are used for other functions and for other fluids flowing in the whole purifying machine that includes apparatus (100) same. Refrigerant (130) contained in tubular body (110) evaporates by the heat of both a coil tube exchanger (111), which is located inside tubular body (110), and a portion of flange (106), which is located under tubular body (110). The assembling and testing steps of the apparatus are much quicker and easier than in the prior art, reducing the risk of leakage. The apparatus is compact and can be made in a simple and not much expensive way.

6 Claims, 5 Drawing Sheets

APPARATUS FOR COLLECTING AND PURIFYING REFRIGERANT IN AIR CONDITIONING SYSTEMS

CROSS REFERENCE TO RELATED APPLICATION

This patent application claims priority of European Patent Application Serial No. EP 02012079.6, filed May 31, 2002.

FIELD OF THE INVENTION

The present invention relates to an apparatus for collecting and purifying refrigerant in air conditioning systems, in particular, but not exclusively, for vehicles.

BACKGROUND OF THE INVENTION

During the normal operation of the air conditioning systems the refrigerant is contaminated by: lubrication oil of the refrigerant circuit compressor, air or other incondensable gas, water and solid particles.

Although the contamination from oil is "physiologic", the other types of contamination are due mainly to undesired effects, such as:

inlet of contaminated refrigerant when loading the circuit, owing either to not pure starting refrigerant or to refrigerant stored in not enough clean reservoirs;
 defects that cause infiltrations of air, through microcracks, in the low pressure branch of the circuit.
 other contamination during the loading step of the circuit or during maintenance.

The presence of air and oil in the refrigerant affects unavoidably the correct operation of the conditioning system, reducing its efficiency, whereas the presence of water in the circuit generates acid substances that can damage the circuit same. It is necessary, therefore, to provide systematic maintenance for restoring the correct characteristics of the fluid.

Presently, the maintenance of the air conditioning systems entails periodically emptying the circuit and collecting the refrigerant after that it has been purified.

To this end, apparatus are provided that comprise, usually, an evaporator formed by a container having in the upper part an inlet for the mixture refrigerant/impurities and in the lower part an outlet for disposing of the impurities gathered on the bottom.

The separation of the impurities from the refrigerant is made through a distillation step by means of progressive evaporation of the refrigerant; since the impurities have a temperature of evaporation higher than the refrigerant, they deposit on the bottom.

Therefore, such apparatus comprise means that heat the refrigerant up to evaporation. The means for heating can be, for example, either a coil tube inserted in the evaporator and directly in contact with the mixture refrigerant/impurities, or an external heating jacket.

In both cases, it is possible to use the refrigerant same as heating medium. After the distillation, in fact, the fluid is compressed, thus reaching a temperature higher than before the distillation. Then, the fluid compressed and heated passes through the heat exchanger for the evaporation of the fluid not yet distilled.

An example of apparatus of this type is described in U.S. Pat. No. 6,263,695 in the name of the same applicant.

During the depuration, furthermore, the fluid entrains oil from the compressor, used for priming the refrigerant by rising its internal energy with respect to the starting condition. Therefore, it is necessary to provide a separator downstream of the compressor capable of collecting the oil from the refrigerant before that the latter is stored in a reservoir.

In order to carry out the whole refrigerant depuration process, firstly, two containers are necessary, one for the evaporator and one for the oil separator. Furthermore many ducts, pipe fittings, valves are necessary for directing the refrigerant through the purification circuit, according to a predetermined layout.

When assembling the apparatus, finally, it is necessary to carefully combine the different components to avoid leakages. However, owing to the high number of fittings:

the assembling and testing steps are time consuming;
 the risk of defects in the apparatus is high.

SUMMARY OF THE INVENTION

It is object of the present invention to provide an apparatus for collecting and purifying the refrigerant of air conditioning systems in which the assembling and testing steps are much quicker and easier than in the prior art.

It is another object of the present invention to provide an apparatus for collecting and purifying the refrigerant of air conditioning systems that achieves a better quality and reduces the risk of leakage.

It is a further object of the present invention to provide an apparatus for collecting and purifying the refrigerant of air conditioning systems that is less bulky than in the prior art.

It is still another object of the present invention to provide such an apparatus where the containers for the evaporator and for the oil separator are made in a simple, quick and not much expensive way.

These and other objects are achieved by the apparatus according to the invention for collecting and purifying the refrigerant of air conditioning systems comprising:

a first tubular body defining the container of the evaporator, in which both the evaporation of the refrigerant coming from the conditioning system and the separation from the impurities take place;
 a second tubular body in which the separation takes place between the refrigerant and the oil downstream of the compressor;
 a heat exchanger in said first tubular body to cause the evaporation of said refrigerant;
 characterised in that a top distribution flange and a bottom distribution flange are provided that keep together said first and second tubular body and close their open ends, ducts and valves being provided for making an hydraulic depuration circuit that comprises said first and second tubular body.

Advantageously, the collected refrigerant to purify is put into the apparatus and circulated through a plurality of ducts made directly in the distribution flanges. Therefore, the number of ducts and of fittings necessary is remarkably less than in the prior art, and then the risk decreases of having leakages during the start-up and operation of the apparatus.

In particular, the reduction of the number of fittings and of ducts necessary for the circuit results in a considerable simplification both of the assembling and of the testing step of the apparatus, with considerable time saving and with less possibility of errors when assembling.

Advantageously, in the bottom distribution flange at least a channel is made directly under the first tubular body used as separator/evaporator. In said channel the warm fluid flows coming from the compressor and going into the exchanger, whereby all the metal base of the evaporator is heated for conductivity. Therefore, the heat exchange surface used is large for all the duration of the evaporation of the refrigerant, independently from the height of fluid contained in the first tubular body, in order to provide a high rate of refrigerant collected and purified.

BRIEF DESCRIPTION OF THE DRAWINGS

Further characteristics and the advantages of the apparatus according to the invention will be made clearer with the following description of an embodiment thereof, exemplifying but not limitative, with reference to the attached drawings, wherein.

DETAILED DESCRIPTION OF THE PREFERRED EMBODIMENT

Figure 1:
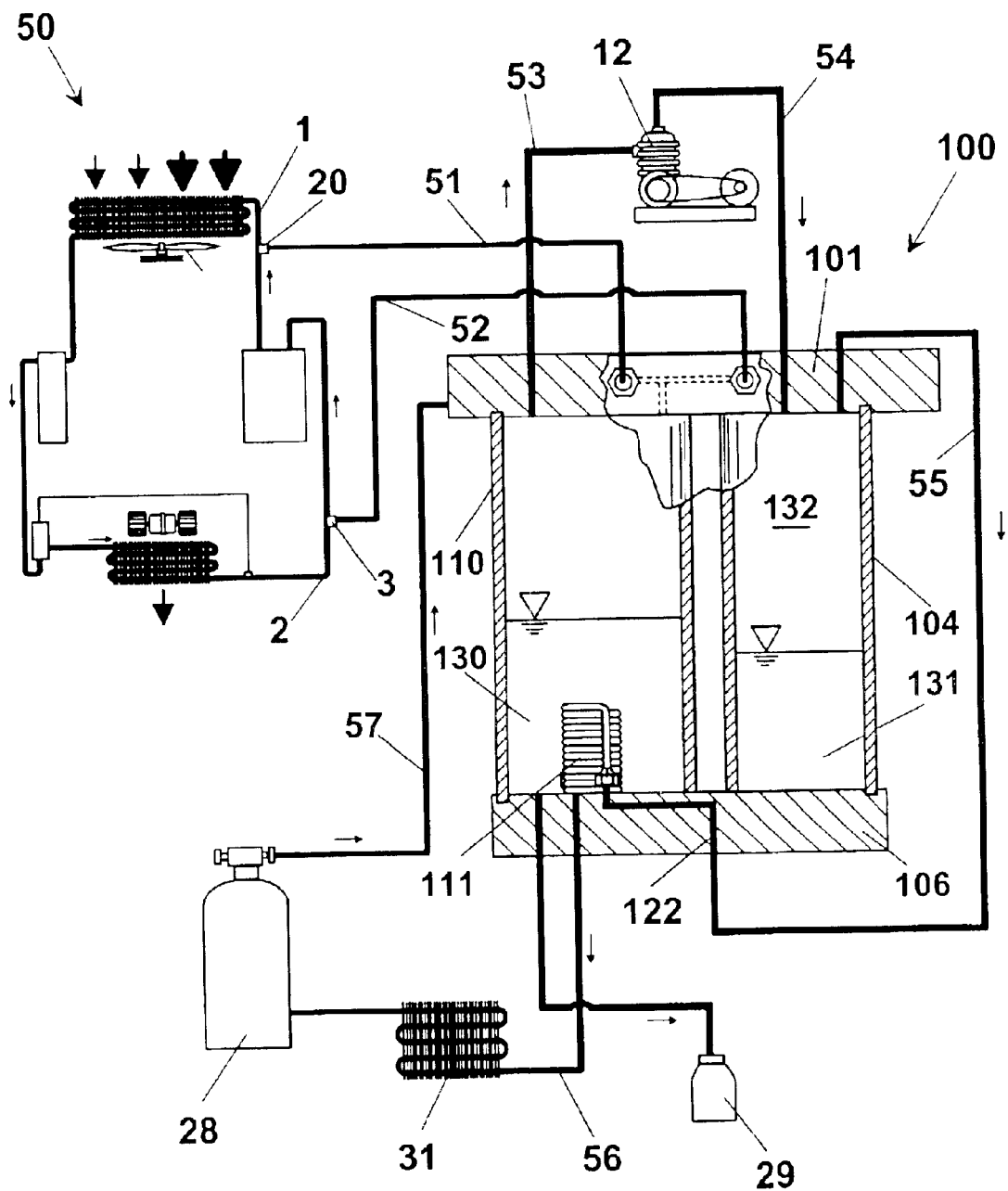
FIG. 1 shows a diagrammatical partial view of the hydraulic circuit of an apparatus according to the invention for collecting and purifying refrigerant of air conditioning systems.

With reference to FIG. 1, an apparatus 100 for collecting and purifying a refrigerant fluid in air conditioning systems, according to the invention, comprises:

a first tubular body 110, used as evaporator and separator of impurities of refrigerant 130 coming from a refrigerant circuit 50, through ducts 51 and 52, and a second tubular body 104 used for separating the fluid 130 from the oil 131.

First tubular body 110 and second tubular body 104 are extruded aluminium tubes arranged between a top distribution flange 101 and a bottom distribution flange 106. In said flanges a plurality of channels are made, which form portions of the circuit for refrigerant 130, as well as are used for other functions and for other fluids flowing in the whole purifying machine that includes apparatus 100 same.

Refrigerant 130 contained in tubular body 110 evaporates by the heat of both a coil tube exchanger 111, which is located inside tubular body 110, and a portion of flange 106, which is located under tubular body 110. For making easier the evaporation of fluid 130, evaporator 110 is kept under vacuum by means of a vacuum pump 9, which is operated after the end of each purifying cycle.

Then, the impurities, which have a temperature of evaporation higher than the refrigerant, are deposited on the bottom of evaporator 110 and so that they can be sent later to a reservoir 29.

Fluid 130 exits in vapour phase from evaporator 110 and, by means of a duct 53, reaches a sealed compressor 12, in which it is compressed and heated, entraining at the same time lubrication oil 131, which is then separated by gravity in oil separator 104. Then, the purified fluid 130 is sent through a duct 55 to coil tube exchanger 111, flowing also in a channel 122, which is made in lower flange 106 (FIG. 6), to provide the heat necessary to the evaporation of fluid 130 contained in evaporator 110.

Figure 2:
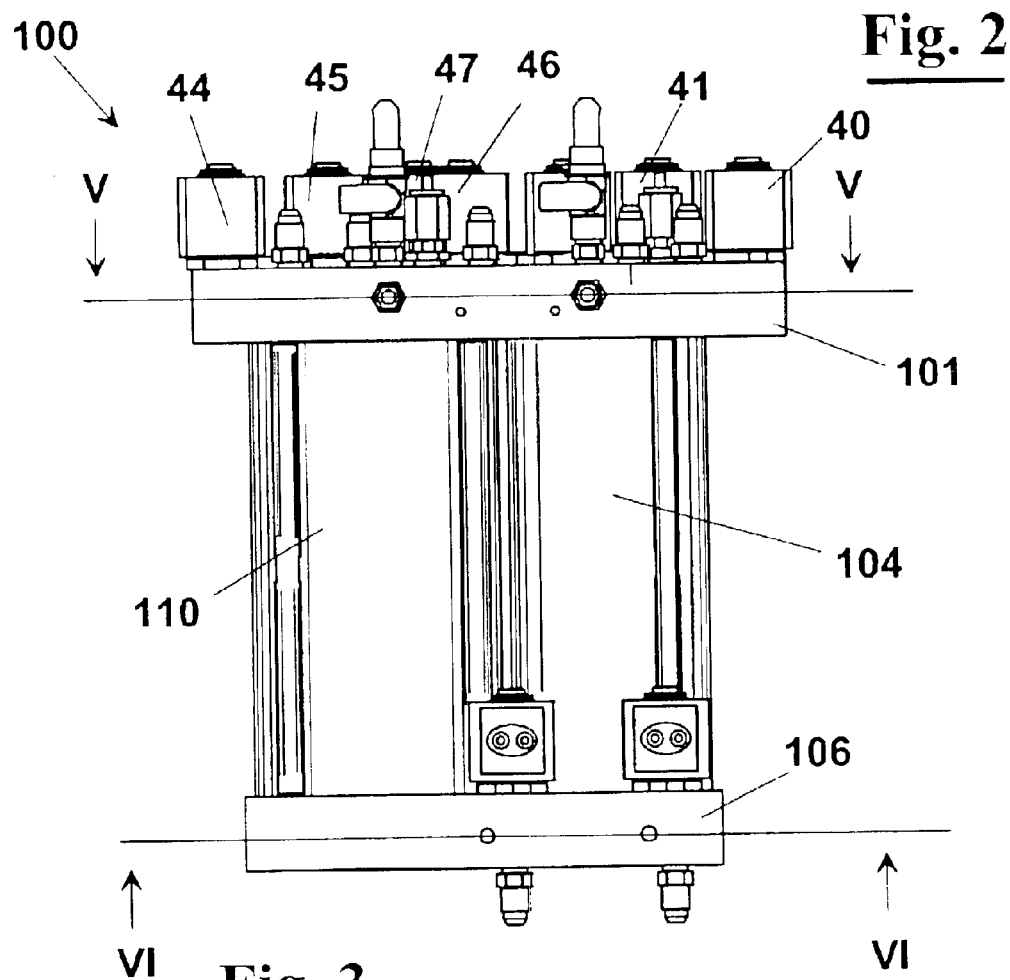
FIG. 2 shows an elevational front view of the apparatus of FIG. 1 complete of electro-valves and tie-rods.
Figure 3:
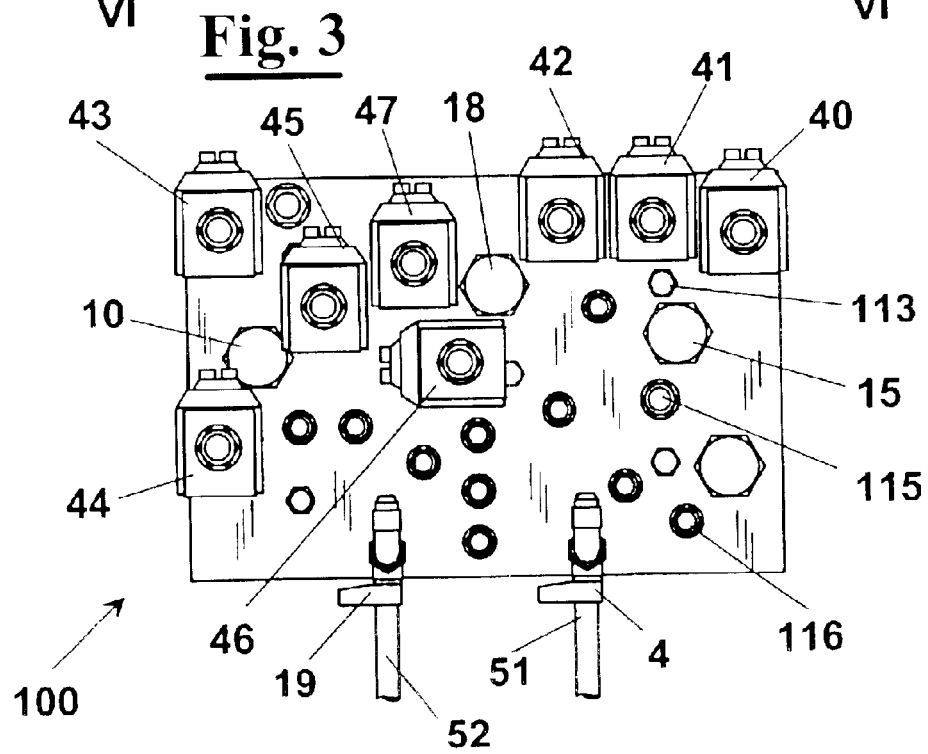
FIGS. 3 and 4 show respectively a top plan view and an exploded view of the apparatus of FIG. 2.
Figure 4:
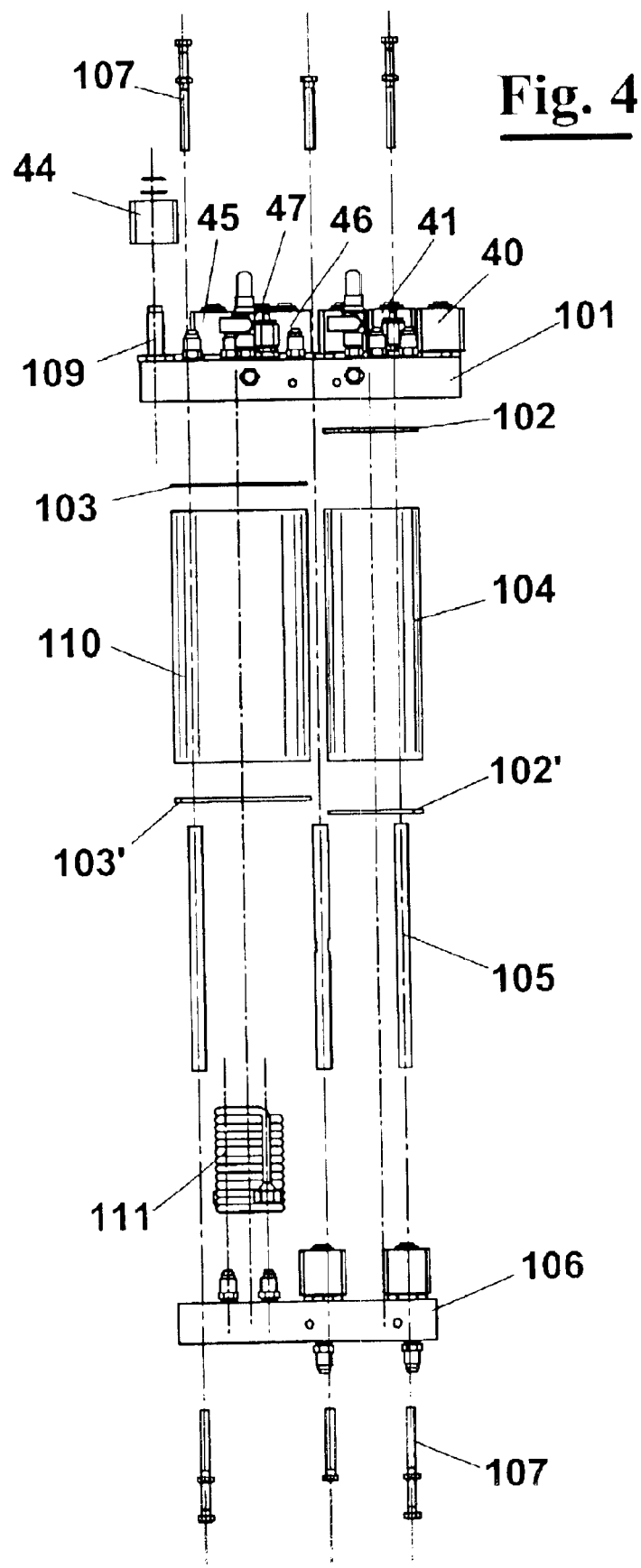

In FIGS. from 2 to 6 the apparatus 100 is shown, according to the invention, highlighting the main structural features. In particular, in FIGS. 2, 3 and 4 a possible arrangement is shown, on distribution flanges 101 and 106, of electro-valves 40–47 and unidirectional valves 10, 15 and 18. For assuring a seal tight coupling between tubular bodies, 110 and 104, and distribution flanges 101 and 106, seal rings 102, 103, 102' and 103' (FIG. 4) are provided.

Figure 5:
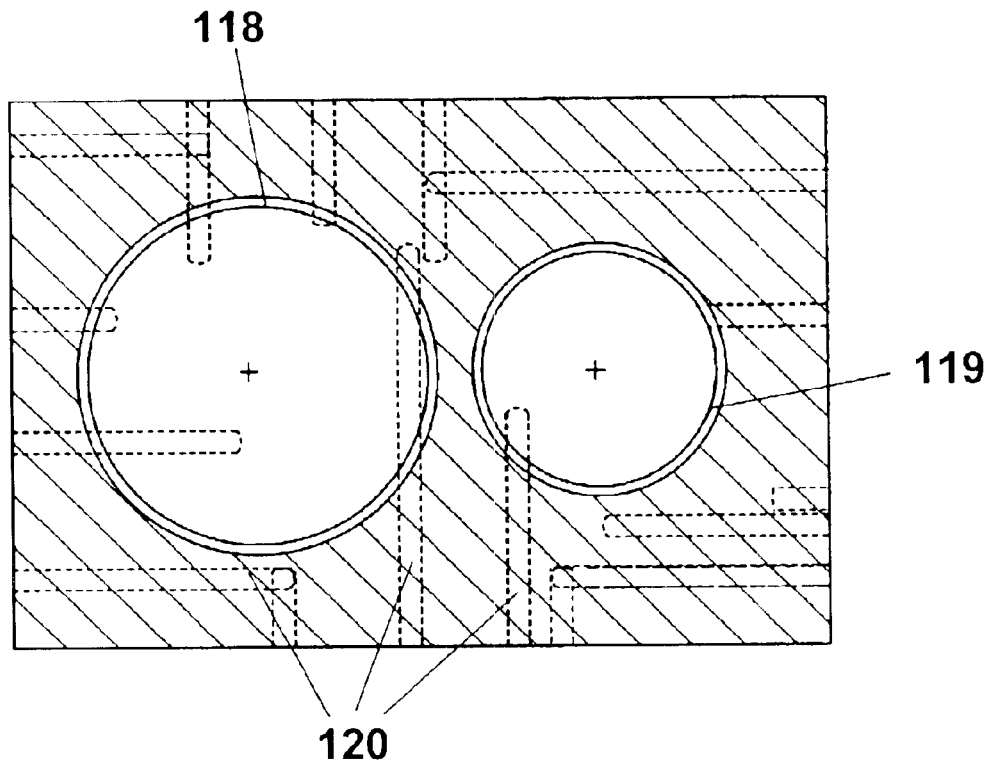
FIG. 5 is a cross sectional view of the apparatus of FIG. 2 according to arrows V—V.
Figure 6:
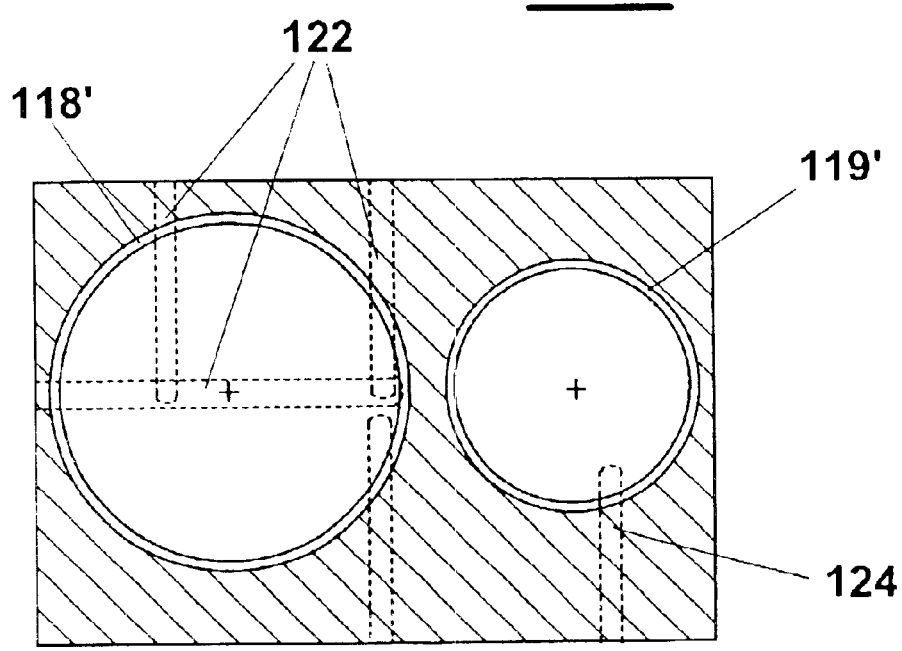
FIG. 6 is a cross sectional view of the apparatus of FIG. 2 according to arrows VI—VI.

In particular, FIGS. 5 and 6 show flanges 101 and 106 of apparatus 100, according to the respective cross sections, in which the hydraulic circuit is shown comprising channels 120 and 122, as well as recesses 118, 119, 118' and 119', in which evaporator 110 and oil separator 104 are housed.

Figure 7:
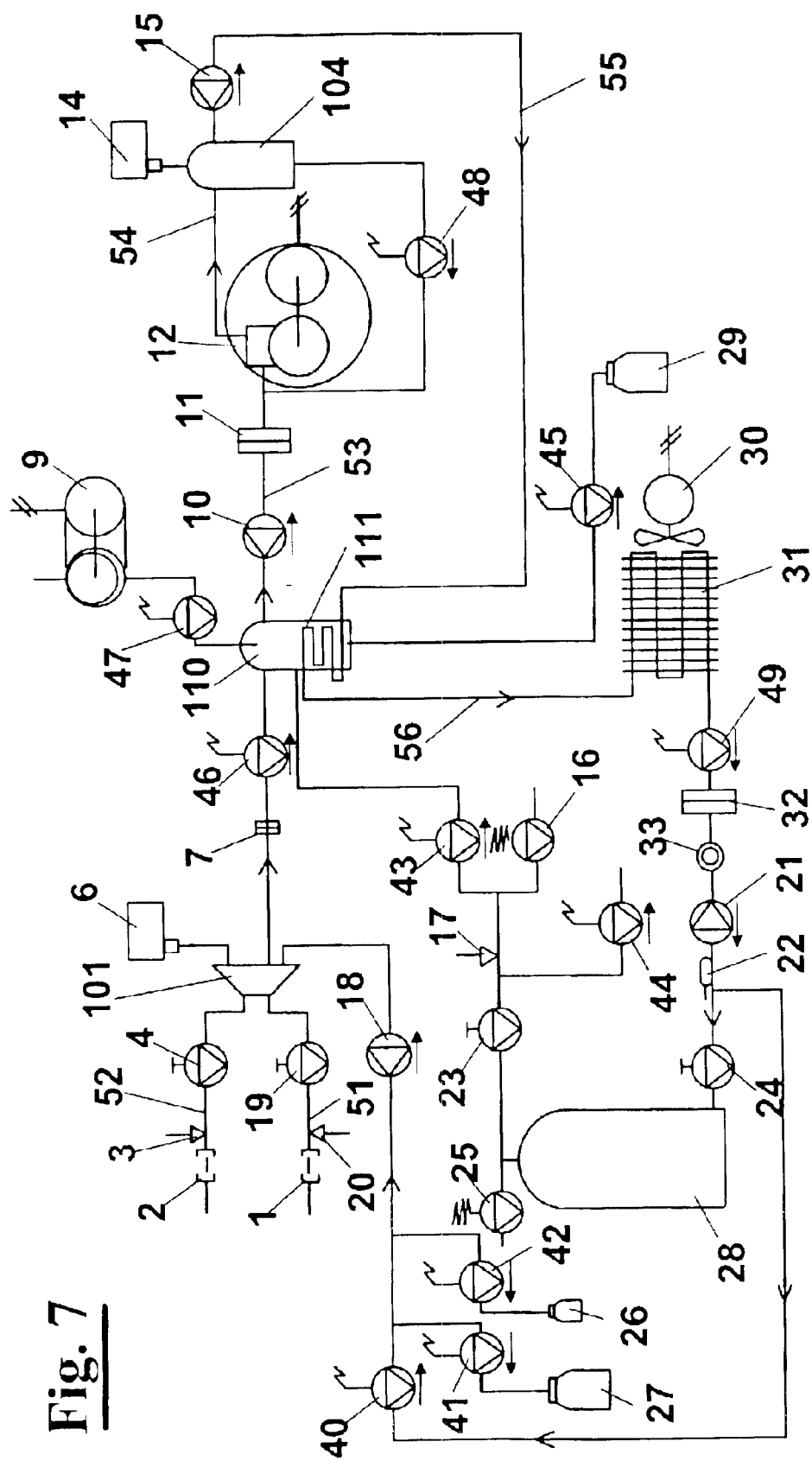
FIG. 7 shows diagrammatically the hydraulic circuit through which the refrigerant is purified, corresponding to the apparatus of FIGS. 1 and 2.

In FIG. 7 the diagrammatical hydraulic scheme is shown of purifying circuit according to the invention. The cooling circuit 50, in which refrigerant 130 is present, is connected by means of ducts 51 and 52 to top distribution flange 101.

The operative conditions, dependent on pressure, are controlled and adjusted by means of a transducer 20, located on the high pressure branch 51, and a transducer 3 located on the low pressure branch 52.

Refrigerant 130 enters evaporator 110, through electro valve 46, after having crossed a mechanical filter 7. In separator 110 the fluid turns into vapour by acquiring the heat necessary for evaporation from coil tube 111, and is separated from the impurities that deposit on the bottom, from where they are loaded later into a container of waste oil 29 through an electro valve 45.

Refrigerant 130, in vapour phase, exits from separator 110 and passes through a check valve 10 on one duct 53 and a filter 11 where is deacidified and dehumidified. Then, refrigerant 130 enters hermetic compressor 12 in which it is compressed and sent to coil tube 111 through duct 55.

When crossing compressor 12 the fluid entrains part of the lubrication oil that is then collected in oil separator 104 and sent back to compressor 12 through electro valve 48.

At the outlet from coil tube 111, the purified refrigerant 130 is sent through a duct 56 to a condenser 31, cooled by a fan 30, and turned into a liquid; then it passes through an electro valve 49 and dehumidified in a filter 32 associated to a controller of humidity 33, before being stored in a reservoir 28.

Flange 101 is furthermore connected directly to reservoir 28 by a duct 57, in which the purified refrigerant flows in liquid phase, controlled by a transducer 17. From flange 101, therefore, by suitably driving the relative electro valves, it is possible also to load the conditioning system circuit 50 with fully purified refrigerant.

With reference to the circuit of FIG. 7, when comparing it with the apparatus of FIGS. 2–6, it is evident that large part of the fittings that would be necessary in a purifying machine, can be avoided thanks to the two distribution flanges 101 and 106, that achieve the objects of the invention of:

holding the two tubular bodies 110 and 104;

defining the channels 120;

providing a heating channel 122 at the base of evaporator 110.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. Apparatus for collecting and purifying refrigerant of air conditioning systems comprising:

a first tubular body defining a container of an evaporator in which both an evaporation of refrigerant coming from a conditioning system and separation from impurities take place;

a second tubular body in which separation takes place between said refrigerant and oil downstream of a compressor;

a heat exchanger in said first tubular body to cause evaporation of said refrigerant; and, a top distribution flange and a bottom distribution flange, wherein said top distribution flange and said bottom distribution flange are operatively arranged to keep together said first and second tubular body and close their open ends, ducts and valves being provided for making a hydraulic depuration circuit that comprises said first and second tubular body.

2. The apparatus recited in claim 1, wherein said refrigerant to collect and regenerate is inserted and circulated through a plurality of ducts made in said distribution flanges.

3. The apparatus recited in claim 1, wherein said bottom distribution flange comprises a channel made directly under said first tubular body, wherein said channel is operatively arranged to be used as separator/evaporator, wherein said warm fluid traverses said channel coming from said compressor flowing and crossing an exchanger, whereby an all metal base of said evaporator is heated for conductivity.

4. A method for purifying refrigerant in air conditioning systems, comprising the steps of:

introducing refrigerant to regenerate in a first container;

evaporating said refrigerant by heating, with deposition of residues present in said refrigerant to purify on a bottom of said first container; and, compressing of said refrigerant vapour and separating in a second container said oil entrained at a compression, wherein said first and second container are tubular bodies kept together by a top distribution flange and a lower distribution flange.

5. The method recited in claim 4, wherein said refrigerant to purify is inserted and circulated through a plurality of ducts made in said distribution flanges.

6. The method recited in claim 4, wherein said refrigerant coming from said compressor is sent into at least a channel made in said bottom distribution flange directly under said first tubular body, which is used as separator/evaporator, and crossing the exchanger, whereby an all metal base of said evaporator is heated for conductivity directly under said first tubular body.

* * * * *